UNITED STATES PATENT OFFICE.

PAUL EHRLICH AND ALFRED BERTHEIM, OF FRANKFORT-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

DERIVATIVE OF AMINOARYLARSINIC ACID.

937,929.  Specification of Letters Patent.  Patented Oct. 26, 1909.

No Drawing.  Application filed August 12, 1908.  Serial No. 448,255.  (Specimens.)

*To all whom it may concern:*

Be it known that we, PAUL EHRLICH, M. D., professor of medicine, and ALFRED BERTHEIM, Ph. D., citizens of the Empire of Germany, residing at Frankfort-on-the-Main, Hesse-Nassau, Prussia, Germany, have invented certain new and useful Improvements in the Manufacture of New Acid Derivatives of the Aminoarylarsinic Acids, of which the following is a specification.

We have found that hitherto unknown derivatives of the aromatic aminoarsinic acids can be obtained by treating them with cyanic acid or its esters. The compounds thus obtained correspond to the constitutional formula:

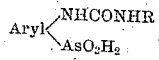

in which "R" represents an alkyl, aryl or hydrogen, and their formation corresponds to the equation:

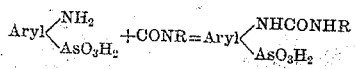

These new compounds are of therapeutical value in infectious diseases caused by the trypanosomas and also in syphilis. They are employed in the form of their neutral alkali salts by subcutaneous injections of doses of up to ½ gr. They are white crystalline products, being difficultly soluble in cold water and alcohol, more readily soluble in hot water, insoluble in ether and benzene and also in diluted acids, but soluble in alkalies. With the latter they form readily soluble crystalline salts.

The procedure for manufacturing the new compounds may for instance be as follows: 620 gr. of sodium salt of p-aminophenylarsinic acid are dissolved in 3.6 liters of water and to the cold solution are then added 480 gr. of potassium cyanate. The solution thus obtained is mixed with 480 gr. of glacial acetic acid and allowed to stand for about 24 hours at ordinary temperature. Thereupon the new compound, which may be termed "carbaminoarsanilic acid", is precipitated by means of 1560 ccm. of hydrochloric acid (specific gravity 1.124). The carbaminoarsanilic acid can be filtered off, recrystallized from water, thus being purified, and afterward dried. It is easily soluble in hot water but difficultly soluble in alcohol, and insoluble in ether and benzene. Combined with caustic soda or sodium carbonate it forms a sodium salt which is readily soluble in water and which crystallizes in small prisms. The acid decomposes when heated to over 180° C., assuming at the same time a dark color. In the same way similar compounds can be produced from other aminoarylarsinic acids, for instance, o-methyl-p-aminophenylarsinic acid yielding with isocyanic acid o-methyl-p-carbamino-aminophenylarsinic acid, which decomposes when heated to about 200° C.; also if, instead of isocyanic acid, its esters are combined with aminoarylarsinic acids, thus for instance p-aminophenylarsinic acid yielding with methyl-isocyanate and phenyl-isocyanate, respectively, methylcarbaminoarsanilic acid, decomposing at about 200° C., and phenylcarbaminoarsanilic acid, which stands a temperature of 240° C., but decomposes when heated in a test tube by a flame.

Having now described our invention, what we claim is:

1. As new products, the compounds the constitution of which corresponds to the formula:

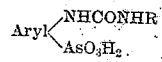

in which "R" represents an alkyl, aryl or hydrogen, being derivatives of aminoarylarsinic acids, white crystalline products which are difficultly soluble in cold water or alcohol, more readily soluble in hot water, insoluble in ether, benzene and diluted acids, which decompose at higher temperature assuming then a dark color, and which form with alkalies salts readily soluble in water.

2. As a new product, the compound the constitution of which corresponds to the formula:

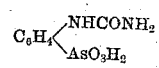

being a derivative of p-aminophenylarsinic acid, a white crystalline compound which is difficultly soluble in cold water and in alcohol, more readily soluble in hot water, insoluble in ether, benzene and diluted mineral acids, which forms with caustic soda and
5 sodium carbonate a readily soluble sodium salt crystallizing in small prisms, and which when heated to over 180° C. decomposes, assuming a brown color.

In testimony whereof, we affix our signatures in presence of two witnesses.

PAUL EHRLICH.
ALFRED BERTHEIM.

Witnesses:
JEAN GRUND,
CARL GRUND.